April 15, 1947.    B. K. HAWES    2,418,836
REMOTE RECORDING SYSTEM
Filed Aug. 19, 1943    2 Sheets-Sheet 1

Inventor:
Bradford K. Hawes,
by Harry E. Dunham
His Attorney.

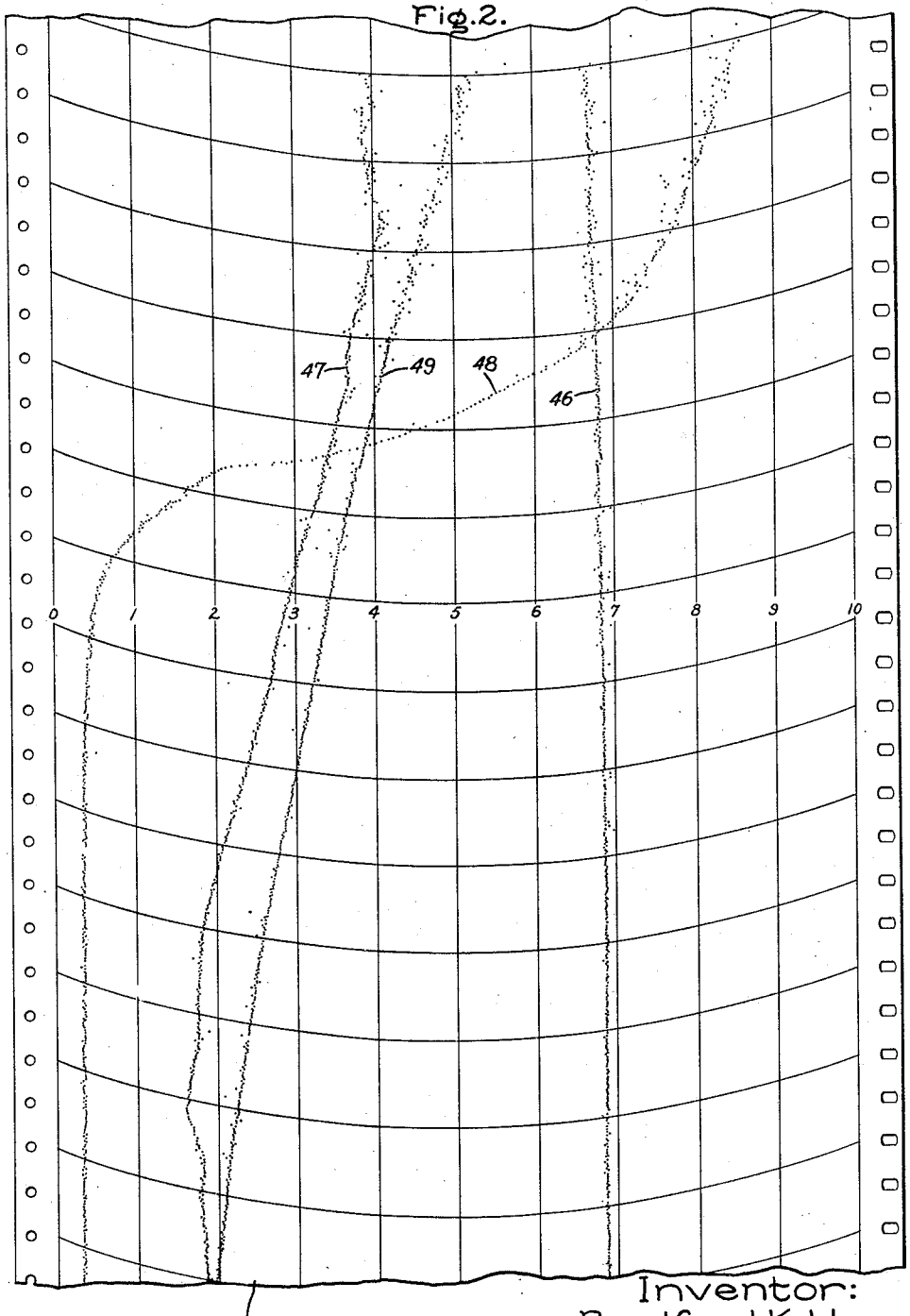

Patented Apr. 15, 1947

2,418,836

UNITED STATES PATENT OFFICE 2,418,836

REMOTE RECORDING SYSTEM

Bradford K. Hawes, Stratford, Conn., assignor to General Electric Company, a corporation of New York Application August 19, 1943, Serial No. 499,247

7 Claims. (Cl. 234—1.5)

The present invention relates to a system providing remote indication of data from a plurality of measuring devices and is particularly concerned with a system for obtaining data sequentially from each of the devices at a rate effectively providing a continuous record.

One use of such a system is in radiosonde where a radio transmitter carried by a balloon is used to transmit to a ground station data from devices responsive to temperature, humidity, etc.

An object of my invention is to provide an improved system of the foregoing type adapted to high speed transmission and recording.

Figure 1A:
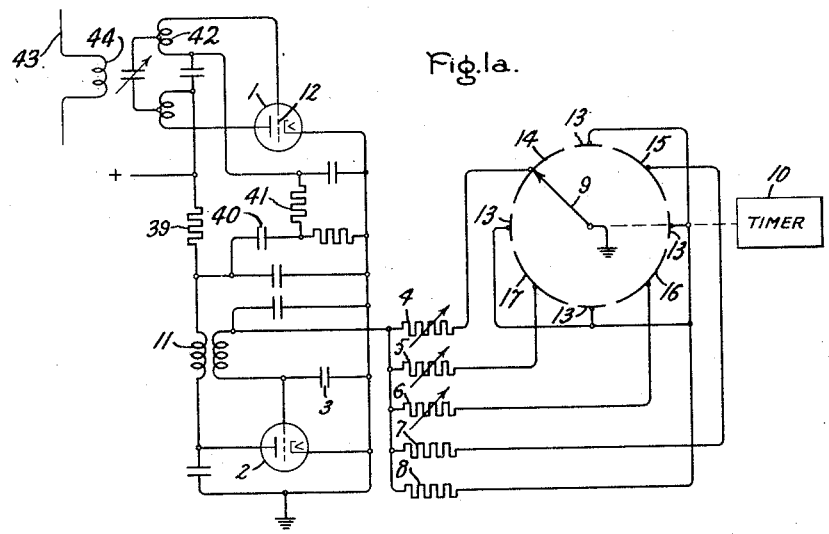
Figure 1B:
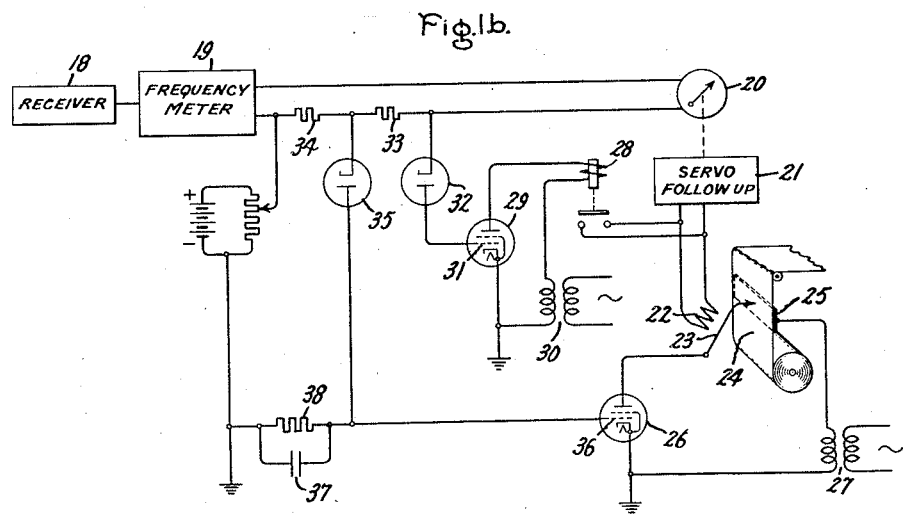

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1a and 1b represent a system embodying my invention. Fig. 2 is a portion of a chart illustrating substantially continuous records of the variation of a plurality of quantities made by the equipment of Fig. 1b.

Referring to the drawing there is shown a radiosonde system for obtaining meteorological data; Fig. 1a representing the transmitting equipment carried by the balloon and Fig. 1b representing the receiving and recording equipment at the ground station.

The transmitter comprises an oscillator 1 grid modulated by a blocking oscillator 2 in which the blocking frequency is controlled by the rate at which a negative charge leaks from a condenser 3 connected to ground sequentially through one of the resistances 4, 5, 6, 7, 8 by means of a contact 9 rotated by a timer 10. The resistances 4, 5, 6 are respectively responsive to temperature, humidity, and pressure, the resistance 7 is a reference or calibrating resistance, and the resistance 8 is a keying resistance. The blocking frequency $$\left(\frac{1}{RC}\right)$$

varies with the respective resistance 4, 5, 6, 7, or 8 and produces a distinctive corresponding modulation frequency for the oscillator 1. Instead of variable resistances, it may be more satisfactory to use variable condensers. The oscillators 1 and 2 oscillate alternately, oscillator 1 being biased off by the plate current of oscillator 2 flowing through resistance 39 and producing a negative bias coupled to the control grid 12 and oscillator 2 being biased off or blocked by the negative charge built up on condenser 3 during oscillation. When operating, the oscillator 2 oscillates at a high frequency and charges capacitor 3 to a negative potential sufficient to interrupt oscillations of oscillator 2. Thereafter, the charge on capacitor 3 leaks off to ground through one of the resistances 4–8 until the current of device 2 reaches the point that oscillation is resumed. The potential of the left terminal of capacitor 40 decreases suddenly when oscillation of device 2 begins. The potential at this point rises quite rapidly when oscillation of device 2 ceases and the current flow through resistance 39 to the anode of device 2 is interrupted. When the anode current flow of device 2 is again resumed, the potential of the left terminal of capacitor 40 again decreases suddenly and the cycle is repeated. The potential of the grid 12 is essentially the same as that of the other terminal of capacitor 40. When anode current of the device 2 flows through resistance 39, a sudden decrease in potential at the left terminal of capacitor 40 is applied as a negative pulse of voltage to grid 12 driving device 1 beyond the cut-off point. This is due to the fact that the potential across capacitor 40 cannot change instantly. As capacitor 40 charges, the potential of grid 12 rises. When oscillation of device 2 ceases and the potential of the left terminal of capacitor 40 rises rapidly, the potential of grid 12 is driven more positive and current flow in device 1 starts. Oscillation of device 1 continues until another negative pulse of voltage caused by initiation of current flow in device 2 again drives tube 1 beyond cut-off. The output of the transmitter oscillator 1 accordingly consists of pulses of radio waves occurring at the blocking frequency of oscillator 2. It will be noted that the keying resistance 8, which causes a blocking frequency out of the range of the other blocking frequencies, for example a higher frequency, is connected to segments 13 intermediate segments 14, 15, 16, 17 respectively connected to the resistances 4, 5, 6, 7. The transmitter output accordingly consists of alternate frequencies or signals proportional to the respective quantities to be measured and intermediate keying frequencies or signals. The transmitter output is supplied to an antenna 43 by means of a coil 44 coupled to the tank circuit of oscillator 1.

The ground station equipment (Fig. 1b) consists of a receiver 18, a frequency meter 19 which produces currents proportional to the signal modulation frequency, or, in other words, currents proportional to the quantities to be measured and to the keying frequency. These currents are measured by an ammeter 20.

The ammeter is connected to a servo-follow-up mechanism 21 which feeds a deflection coil 22 causing a stylus 23 to deflect to a position corresponding to the ammeter reading. The servo follow-up mechanism may be, for example, of the type employed in the General Electric Company high speed photoelectric recorder, certain features of which are described and claimed in United States Patent 1,897,850, granted February 14, 1933, to Cramer W. LaPierre. The stylus rests on a strip 24 of chemical recording paper fed over an electrode 25 at a constant speed and is in series with a gaseous discharge device 26 in the secondary circuit of a transformer 27. When the device 26 is conducting, a current flows from the stylus through the paper, causing a mark on the paper representing the deflection of the stylus.

During the keying signals, the deflecting coil 22 is shorted by a normally closed relay 28 which is held open between the keying signals by the current flowing through a gaseous discharge device 29 connected across the secondary of a transformer 30. The device 29 has a grid 31 connected through a diode 32 to the negative end of a resistance 33 in series with the frequency meter 19. When the current in the resistance 33 corresponds to one of the measurement signals, the device 29 is conducting and the relay 28 is held open. The higher frequency keying signals cause a larger current through the resistances 33 driving the grid 31 to cut-off and causing the closing of the relay 28. The short circuit of the deflection coil 22 removes all deflecting forces from the stylus which accordingly merely remains limp at the previous position. At the end of the keying signal, the device 29 conducts causing the relay 28 to pick up and remove the short circuit.

The keying signal is also used to interrupt the recording by the negative bias from a resistance 34 which is applied through a diode 35 to the grid 36 of the device 26, biasing the device to cut-off. The cut-off bias remains on the device 26 throughout the keying signal and for an additional interval determined by the time required for a grid condenser 37 to discharge through a resistance 38. The additional interval is sufficient to allow the stylus to reach the position corresponding to the next succeeding measurement signal.

In the use of the system, a balloon carrying the equipment of Fig. 1a is released and the rotation of the contact 9 (for example at 30 R. P. M.) sequentially connects the resistances 4, 5, 6, and 7 in the circuit of the blocking oscillator alternately with the keying resistance 8 causing the transmission of alternate measurement and higher frequency keying signals. All of the signals are picked up by the receiver at the ground station and supplied to a frequency meter 19 which causes a current flow through the resistances 33 and 34 proportional to the keying and measurement frequencies. These currents flow through the ammeter 20 causing a deflection which is transmitted through the follow-up mechanism 21 to the stylus 23 of a recording instrument. The currents due to the keying signals are used to stop the deflection of the stylus during the keying interval and to interrupt the recording during the keying interval, and during the initial part of the succeeding interval so the stylus can move without recording to a position corresponding to a succeeding measurement. Due to the high speed of rotation of the contact 9, a substantially continuous record is obtained of the measurements.

In Fig. 2 there is shown a portion of a record obtained by the recording equipment employed in the circuit of Fig. 1B. Assuming that the chart 45 is traveling from the bottom of the figure to the top, the horizontal lines are spaced apart by a time interval which may be equal approximately to one minute. While any number of predetermined quantities may be measured sequentially, I have shown a portion of the continuous records of three quantities and a reference signal. Thus, the dotted line 46 may represent a reference signal which corresponds to the frequency obtained when the calibrating or reference resistance 7 is connected in the circuit of blocking oscillator 2. The line 47 may correspond to the variable temperature and is obtained when the resistance 4 is connected in the circuit of the blocking oscillator 2. Similarly, the lines 48, 49 correspond to, respectively, humidity and pressure measurements obtained when the resistances 5 and 6 are connected in the circuit of the blocking oscillator. It will be noted that each of the lines consists of a series of closely spaced dots so that, in effect, a substantially continuous record of each of the quantities being measured is obtained.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. In an apparatus for intermittently recording a plurality of variable quantities on a single record strip, means for producing a current which varies in accordance with said quantities, means for interposing between said current values corresponding to said quantities other current values corresponding to a predetermined keying signal, means including a stylus and a deflection coil therefor for marking a record in accordance with said first mentioned current values, means for short-circuiting said coil during the occurrence of said other current values, and means for interrupting the marking of said record by said stylus during the occurrence of said other current values and during the initial portion of the occurrence of a subsequent one of said first mentioned values to prevent recording the movement of said stylus between the positions corresponding to said quantities.

2. In an apparatus for intermittently recording a plurality of variable quantities on a single record strip, means for producing a current which varies in accordance with said quantities, means for interposing between said current values corresponding to said quantities other current values corresponding to a predetermined keying signal, means including a stylus and a deflection coil therefor for marking a record in accordance with said first mentioned current values, means responsive to said other current values for short-circuiting said coil during the occurrence of said other current values and for interrupting the marking of said record by said stylus during the occurrence of said other current values and during the initial portion of the occurrence of a subsequent one of said first mentioned values to prevent recording the movement of said stylus between the positions corresponding to said quantities.

3. In an apparatus for intermittently recording a plurality of variable quantities on a single record strip, means for producing a current which varies in accordance with said quantities, means for interposing between said current values corresponding to said quantities other current values corresponding to a predetermined keying signal, means for marking said record strip in accordance with said first mentioned current values including a spark generator for causing a spark discharge through said record strip, a stylus and a deflection coil for said stylus, means for short-circuiting said coil during the occurrence of said other current values, and means for preventing said spark discharge from occurring during the occurrence of said other current values and during the initial portion of the occurrence of a subsequent one of said first mentioned values whereby recording the movement of said stylus between the positions corresponding to said quantities is prevented.

4. In a system for recording a plurality of measurements, means for receiving a series of signals, alternate of which correspond to the respective measurements and the remainder of which are keying signals, means for recording said measurements, means responsive to the keying signals for stopping the recording during the keying signals and during the initial part of the subsequent measurement signals to prevent recording the movement of the instrument between the positions corresponding to the respective measurements.

5. In a system for recording a plurality of measurements, means for receiving a series of signals, alternate of which correspond to the respective measurements and the remainder of which are keying signals, means including a stylus positioned by a deflection coil for recording said measurements, means responsive to the keying signals for short-circuiting the deflection coil during the keying signals and for interrupting the recording during the keying signals and during the initial part of the subsequent signals to prevent recording of the movement of the instrument between the positions corresponding to the respective measurements.

6. In a recorder a signal responsive instrument movable to positions corresponding to the respective values of a plurality of quantities controlling said instrument at intervals, means for effecting recording in said positions and other means responsive to another value for interrupting recording for the duration of said other value and for an additional interval less than the duration of said first value whereby said recorder is adapted to make a record of said quantities upon receipt of a sequence of signals, alternate ones of which correspond to said other value and the remainder of which constitute a series of signals corresponding to the respective first values of said quantities.

7. In a recording instrument, means positionable in accordance with signals corresponding to the value of a quantity for recording said value, and means responsive to a keying signal for interrupting recording during the keying signal and for a short time thereafter whereby through interspersing said keying signals in a series of signals corresponding to values of different quantities the recording of the transitional positions of the recording means is omitted.

BRADFORD K. HAWES.

REFERENCES CITED

The following references are of record in the file of this patent:

UNITED STATES PATENTS

| Number | Name | Date |
|---|---|---|
| 1,929,241 | Franklin | Oct. 3, 1933 |
| 2,210,903 | Dunmore | Aug. 13, 1940 |
| 2,207,343 | Fairchild | July 9, 1940 |